Jan. 22, 1946.  W. T. LEE  2,393,387
MILK COOLER
Filed July 15, 1944

Inventor
W. T. Lee
By Frederick C. Bromley
Atty.

Patented Jan. 22, 1946

2,393,387

UNITED STATES PATENT OFFICE 2,393,387

MILK COOLER

William T. Lee, Norfolk, Va.

Application July 15, 1944, Serial No. 545,182

3 Claims. (Cl. 257—183)

The invention generally appertains to apparatus for cooling liquids and particularly to a milk cooler of the class in which milk flows over a cooling surface and in which the heat-absorbing fluid circulates transversely thereof and is separated therefrom by a dividing wall.

The invention has as a paramount object the provision of a highly efficient apparatus for cooling liquids by gravity flow over a surface comprised of cooling devices so constructed as to retard the flow of the liquid as it gravitates over said surface and to thus allow ample opportunity for absorption of heat so that maximum cooling will rapidly ensue.

The invention has as a further object the provision of a cooling apparatus having an inclined flow surface for cooling liquid characterized by a series of transversely arranged coils through which brine or comparable liquid is circulated from one to another in a general upward direction and in which there is provided a further series of coils at the lower end of said series for upward circulation of a cooling agent generated by a refrigeration unit for producing an accelerated cooling action at the final stage of the cooling treatment.

The invention has as a still further object the production of a cooling apparatus having a downflow cooling surface including extant sections inwardly curved whereby liquid flowing over the surface has a tendency to cling in transversing the extant sections so that a retard-flow action ensues.

A distinctive feature of construction is that the apparatus is insulated against absorption of heat from the ambient atmosphere and therefore the effect of room temperature is negligible.

The invention consists in the novel construction and arrangement of parts as illustrated in the selected embodiment of the apparatus shown in the accompanying drawing and described in detail in the following specification.

In the drawing.

Like numerals of reference indicate corresponding parts in each of the figures throughout the drawing of the invention.

Figure 1:
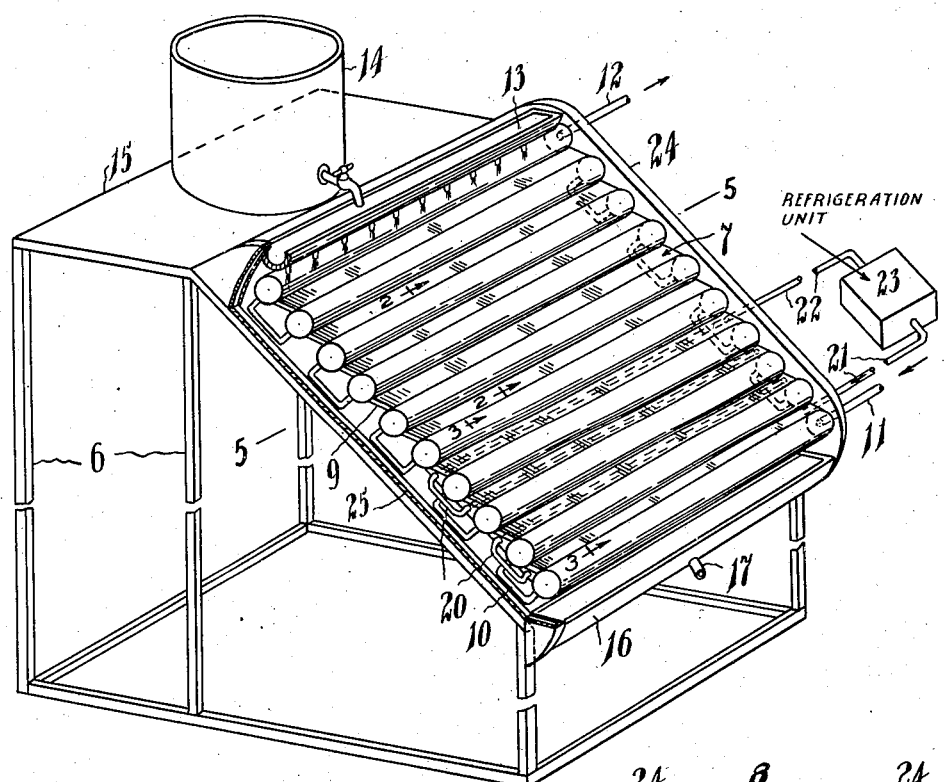
Fig. 1 is a perspective view of the apparatus in which a wall-part is broken away to show the cooling coils to better advantage.
Figure 2:
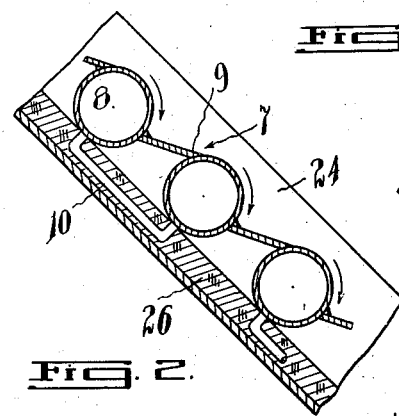
Fig. 2 is a section on line 2—2 thereof.
Figure 3:
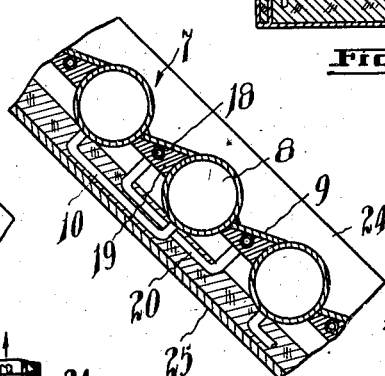
Fig. 3 is a section on line 3—3 thereof.
Figure 5:
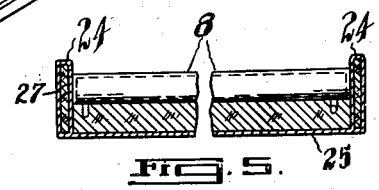
Fig. 5 is a cross section on line 5—5 of Fig. 1.

The apparatus comprises a suitable frame forming a stand 6 for supporting the cooling unit which presents a gravity flow surface for the liquid to be cooled. The flow surface is denoted as a whole by the numeral 7 and is composed of a series of transverse coils 8 spaced from one another and united by division plates 9. Said coils are hollow cylindrical members having their axes horizontally disposed and contained in an inclined plane sloping at an angle of about 45° to the base of the stand. The cylindrical members are closed at their ends as by caps and the ends are connected in a common manner as by ducts 10 forming return bends for adjacent coils by which a cooling medium is circulated back and forth throughout the entire series of coils.

The ducts 10 are disposed below the surface 7 and the lowermost coil is supplied with an inlet pipe 11. The uppermost coil is supplied with an outlet pipe 12. The inlet and the outlet pipes are connected to a source of cold water under pressure, i. e. tap water, whereby circulation of the cooling agent is in a general upward direction.

Each division plate extends upwardly from the bottom side of a coil to the top side of the adjacent lower coil on an obtuse slope and its upper side is tangential with the said adjacent lower coil. The plate is soldered to the adjacent coils which it bridges and is on a gradual slope. By this construction it will be manifest that liquid flowing over the external surface of a coil will cling to the lower portion in its travel toward the division plate and will be thus retarded so that the cooling agent circulating through the coil can function to the utmost advantage in exchange of heat. A distinctive feature of the structure is that liquid will flow over the surface 7 in a smooth film without dripping or splashing.

A spreader trough 13 is arranged over the uppermost coil and is provided with a longitudinal series of perforations as customary for distribution of liquid from a receptacle 14 seated on a platform 15 supplied by the stand aforesaid. A collecting trough 16 is disposed below the lowermost coil and furnished with a spout 17 for discharging the cooled liquid into a vessel therebelow, which is not shown since it does not form a part of the invention.

Figures 4, 6:
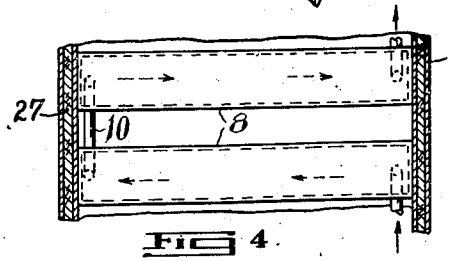
Fig. 4 is a fractional face view of the cooling surface.
Fig. 6 is a detail of the coils which connect with the refrigeration unit.

The device at the lower section of the surface 7 for rapidly cooling liquid gravitating thereover comprises several coils as at 18 each subtending beneath a division plate and leaded thereto as at 19. The coils 18 are connected by ducts 20 at their ends which constitute return bends for circulating an expansion fluid back and forth therethrough from a lower inlet pipe 21 to an upper outlet 22. The coils 18 and their return bends are diagrammatically illustrated in Fig. 6. The return bends are disposed below the surface 7. The inlet 21 and the outlet 22 are connected to a standard refrigeration unit 23, indicated in Fig. 1.

Accordingly it will be seen that the coils 18 produce a zone at the lower section of the surface 7 which is colder than the upper section thereof and which will assure of a more rapid absorption of heat in the final cooling stage.

The cylindrical coils 8 and the bridge plates 9 form a continuous surface for the downflow of the liquid from the container 14 and are joined to sidewalls 24 integral with or secured to a bottom wall 25 enclosing the underside of all the coils and their connecting ducts. The space between the coil structure and the bottom wall 25 is insulated as by cork indicated at 26; therefore room temperature does not have any appreciable effect on the cooling unit. Desirably the sidewalls 24 are also insulated as denoted at 27. The cooling surface 7 is covered as by a suitable lid, which may rest upon said sidewalls. The lid is not shown as it may be of ordinary construction.

The apparatus herein recounted is admirably suited for farm use and provides for the expeditious cooling of milk, which is aerated in the cooling treatment. The cooled milk can be held over-night at the proper temperature in cooling tanks ready for shipment the next morning.

The apparatus is a labor saving device and is most efficient in the absorption of heat. It can be used with a standard refrigeration unit with which farms are equipped. The insulated cooling unit prevents pick-up of room heat and the only actual transfer of heat is from the fluid treated. The cooling unit is preferably made of stainless steel and the angle of inclination prevents dropping and splashing of the milk in flowing over the cooling surface. The retard structure of the cooling unit has been found to be eminently satisfactory and is exceedingly efficient in bringing about rapid and uniform cooling of milk to a proper temperature. The invention is inexpensive to manufacture and such modifications thereof may be resorted to as come within the scope of the ensuing claims.

What I claim is:

1. In cooling apparatus for liquids, means providing an inclined surface for gravity flow of liquid, said means comprising a transverse series of tubular members through which a cooling fluid is circulated, said tubular members having their axes in a common plane, walls bridging adjacent tubular members and extending tangentially from the top portion of the lower one to meet the upper one substantially at the plane containing the axes of the tubular members, and passages provided in at least some of said walls for circulation of a cooling fluid therethrough.

2. A structure as set forth in claim 1, in which the tubular members are provided with connections for circulating water therethrough, and in which the passages of the bridging walls are provided with connections for circulating a cooling fluid of a refrigeration unit therethrough.

3. In cooling apparatus for liquids the combination, a transverse series of tubular members horizontally supported in spaced relation with the series extending in a general downward direction for gravity flow of liquid thereover, said tubular members adapted to have a cooling fluid circulated therethrough, walls bridging adjacent tubular members, and means providing passages in at least some of said walls for circulation of a cooling fluid therethrough.

WILLIAM T. LEE.